United States Patent [19]

Inaba et al.

[11] Patent Number: 4,865,536
[45] Date of Patent: Sep. 12, 1989

[54] DIRECT MOLD CLAMPING APPARATUS WITH EJECTOR

[75] Inventors: Yoshiharu Inaba, Kawasaki; Fumio Mitoguchi; Shigeo Tokunaga, both of Hino, all of Japan

[73] Assignee: Fanuc Ltd., Minamitsuru, Japan

[21] Appl. No.: 221,251

[22] PCT Filed: Oct. 13, 1987

[86] PCT No.: PCT/JP87/00767
§ 371 Date: Jun. 17, 1988
§ 102(e) Date: Jun. 17, 1988

[87] PCT Pub. No.: WO88/02687
PCT Pub. Date: Apr. 21, 1988

[30] Foreign Application Priority Data

Oct. 13, 1986 [JP] Japan .................. 61-241447

[51] Int. Cl.[4] .................................. B29C 45/66
[52] U.S. Cl. ...................... 425/556; 425/589; 425/595
[58] Field of Search .......... 425/554, 556, 589, 595

[56] References Cited

U.S. PATENT DOCUMENTS 4,230,442  10/1980  Rees et al. .................... 425/595

FOREIGN PATENT DOCUMENTS 24311  2/1984  Japan.

Primary Examiner—Jay H. Woo
Assistant Examiner—Timothy W. Heitbrink
Attorney, Agent, or Firm—Staas & Halsey

[57] ABSTRACT

There is provided a direct mold clamping apparatus with an ejector, which is capable of uniformly applying a mold clamping force to a movable platen and is simple in construction and compact in size. A hollow cylindrical push member (12) and a movable platen (3) are coupled to each other through a single junction plane, in the form of an annular ring. A driving force transmitted through the push member is applied uniformly to the movable platen. The ejector (1) of the mold clamping apparatus (2) is provided with a ball nut (7) disposed in a hollow portion of the push member. A ball screw (6), which mates with the nut, is coaxial with a ball screw (8) for mold clamping, and has a front end fixed to an ejector pin (4) and the rear end portion removably fitted in a hole (8a) in a front end portion of the mold clamping ball screw. Thus, the axial length of the mold clamping apparatus is reduced.

13 Claims, 4 Drawing Sheets

DIRECT MOLD CLAMPING APPARATUS WITH EJECTOR

BACKGROUND OF THE INVENTION

1. Field of the Invention

The present invention relates to a direct mold clamping apparatus with an ejector, which is capable of uniformly applying a mold clamping force to a movable platen and is simple in construction and compact in size.

2. Description of the Related Art

Conventionally known direct mold clamping apparatuses include a push rod fixed to a movable platen, a ball nut attached to the rod so as to be rotatable and movable integrally with the rod and a ball screw mating with the nut. The ball screw is rotated in forward and reverse directions to reciprocate the movable platen, thereby effecting mold closing and mold opening operations. In apparatuses of this type, an ejector for ejecting moldings is attached to the movable platen in a manner such that the movable-platen-side end portion of the push rod is branched so that each branch end portion extends at a location outwardly of the ejector, and the extreme end of the branch end portion is coupled to its corresponding edge portion of the movable platen, to avoid interfering with the ejector. However, the distribution of a driving force applied to the movable platen through the branch end portions of the pusher rod is likely to produce irregular pressure force, so that the movable platen may possibly be deformed when it is subjected to a mold clamping force. In this case, a gap will be formed between a movable die and a stationary die at their contact faces, so that the moldings will be burred, for example. Thereupon, the movable platen is conventionally given a high rigidity such that it cannot be deformed even when it is subjected to an irregular mold clamping force. To attain this, however, the weight of the movable platen is increased thus requiring the use of a high-output drive source. As the moving speed of the movable platen is reduced, moreover, the required molding cycle time is inevitably lengthened. If the movable platen is bent as aforesaid, the movable platen rubs against its tie bars, thus creating friction loss and errors in control of the mold clamping force.

Furthermore, the mold clamping apparatuses with ejector are required to be simplified in configuration and made compact.

SUMMARY OF THE INVENTION

An object of the present invention is to provide a direct mold clamping apparatus with an ejector, which apparatus is capable of uniformly applying a mold clamping force to a movable platen and is simple in construction and compact in size.

In order to achieve the above subject, according to the present invention, there is provided a direct mold clamping apparatus with ejector, where a first ball nut is attached to a hollow push member, fixed to a movable platen, so as to be non-rotatable relative to the push member and movable integrally therewith, and a first ball screw, which is threadedly engaged with the first ball nut and extends through a hollow portion of the pusher member, is rotated by means of a first drive source, thereby effecting mold closing and mold opening operations.

In this mold clamping apparatus, the push member is coupled to a central portion of the push-member-side end face of the movable platen through a substantially single annular junction plane. An ejector of the mold clamping apparatus includes a second ball nut supported in the hollow portion of the pusher member so as to be rotatable and axially immovable relative to the movable platen. A second ball screw, which mates with the second ball nut, is disposed in axial alignment with the first ball screw, and has, as its one side remote from the movable platen, one end portion removably fitted in a hole axially formed in a corresponding end portion of the first ball screw. An ejector pin is fixed to another end portion of the second ball screw facing the movable platen, and is arranged for projection from an end face of the movable platen remote from the push member. Further, a second drive source is operatively connected to the second ball nut.

According to the present invention, as described above, the components of the ejector on the push member side are arranged within the hollow portion of the pusher member, and the pusher member is coupled to the central portion of the end face of the movable platen through the single annular junction plane. Accordingly, a uniform clamping force can be applied to the movable platen through the push member. During mold clamping operation, therefore, the mold clamping force on the movable platen cannot be unevenly distributed, so that the movable platen cannot be deformed due to such uneven distribution. Thus, moldings cannot be burred, and there will be no errors in molding force control due to rubbing between the movable platen and tie bars. Since the movable platen need not be given rigidity for the prevention of its flexural deformation moreover, it can be reduced in weight, thus permitting shortening of the required cycle time and reduction in cost.

Since the ejector pin is fixed directly to the ball screw, furthermore, the efficiency of the drive of the ejector pin is high. In contrast with the case of the conventional apparatuses in which the ejector pin is driven by means of a plurality of ball screws.

Moreover, there is no need to provide members for coupling the plurality of ball screws and the ejector pin or a mechanism for synchronously driving the ball screws. Thus, the construction of the apparatus is simplified.

Furthermore, the ball screw for the ejector is fitted in the hole in the ball screw for mold clamping, so that the axial length of the mold clamping apparatus can be reduced without interference between the two ball screws. Thus, the apparatus can be made compact.

FIG. 2 shows a known mold clamping apparatus with an ejector. The ejector 1 of the mold clamping apparatus 2 is attached to a movable platen 3 so that its ejector pin 4 projects from the rear side of the movable platen 3 to the front side thereof. More specifically, a pressure plate 5, which is connected integrally to the ejector pin 4, has its vertical or horizontal edge portions coupled individually to ejector-use ball screws (hereinafter referred to as second ball screws) 6. Ejector-use ball nuts (hereinafter referred to as second ball nuts) 7, which mate individually with the ball screws 6 and are rotatably supported on the movable platen 3, are rotated forwardly or reversely in synchronism with each other by means of an ejector-use motor (not shown) fixed to the movable platen 3, whereby the ejector pin 4, which is integral with the pressure plate 5, is advanced or retracted through the medium of the ball screws 6 and the pressure plate.

As a mold clamping ball screw (hereinafter referred to as first ball screw) 8 rotates forwardly or reversely, the movable platen 3 moves in a mold closing or opening direction. More specifically, the first ball screw 8, whose rear end portion is supported on a rear platen 10 so as to be rotatable and axially immovable, is rotated forwardly or reversely by means of a mold clamping motor (not shown) with the aid of a pulley 11, so that the movable platen 3 is pushed by a push rod 12 which is movable integrally with a mold clamping ball nut (hereinafter referred to as first ball nut) 9 mating with the ball screw 8.

In order to avoid interfering with the pressure plate 5 of the ejector 1, the front side of the push rod 12 is divided into two parts, which are coupled to the vertical or horizontal edge portions of the movable platen 3. If the push rod 12 is halved in this manner, the movable platen 3 is pressed at two points, i.e., left and right or upper and lower, so that a force from the mold clamping motor cannot be uniformly transmitted to the whole movable platen. If it is subjected to a great mold clamping force, therefore, the movable platen 3 is deformed, thus entailing the aforementioned awkward situations. Also, the ejector requires more components and is complicated in construction.

DETAILED DESCRIPTION OF THE PREFERRED EMBODIMENTS

The following is a description of a mold clamping apparatus with ejector according to one embodiment of the present invention.

Figure 1:
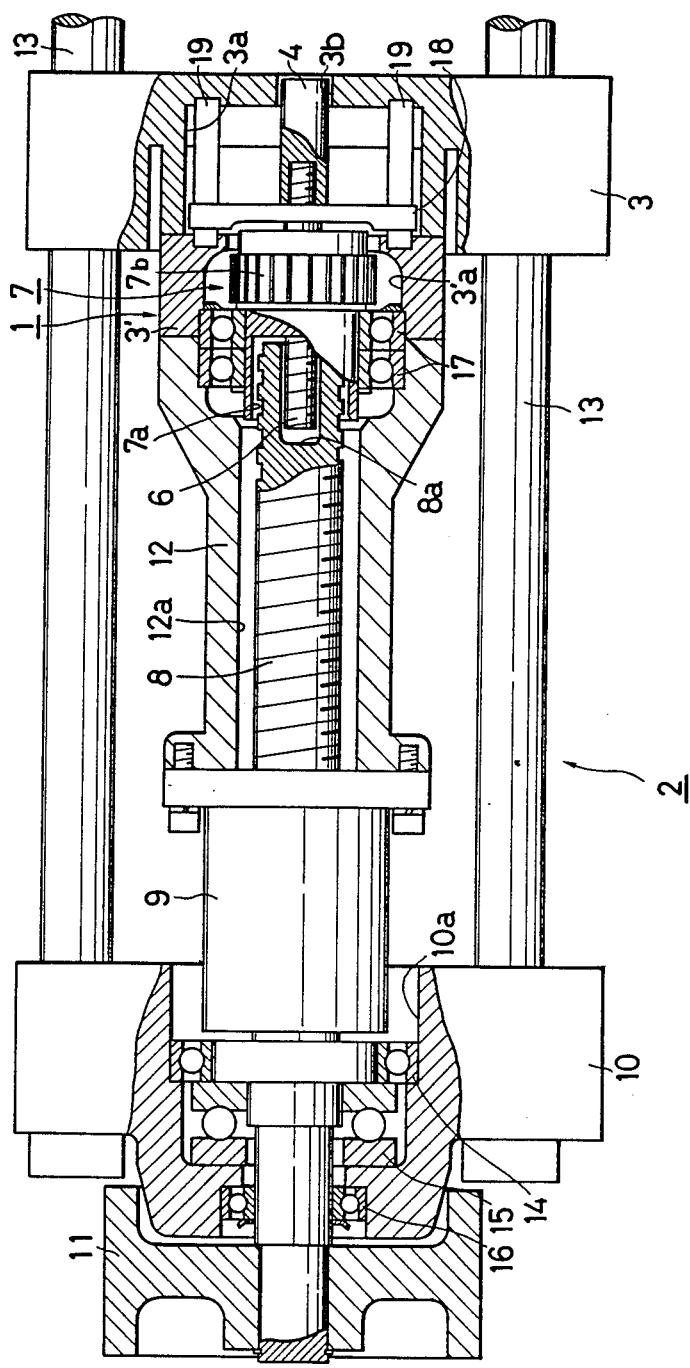
FIG. 1 is a front view, partially cut-away, showing the principal part of a mold clamping apparatus with ejector according to one embodiment of the present invention.
Figure 2:
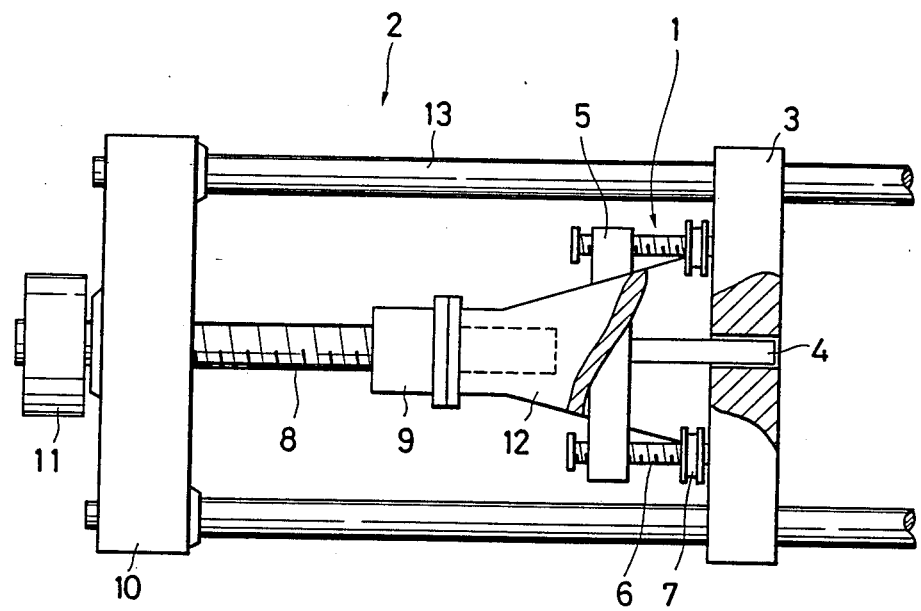
FIG. 2 is a front view, partially cut-away, showing the principal part of a known mold clamping apparatus.
Figure 3:
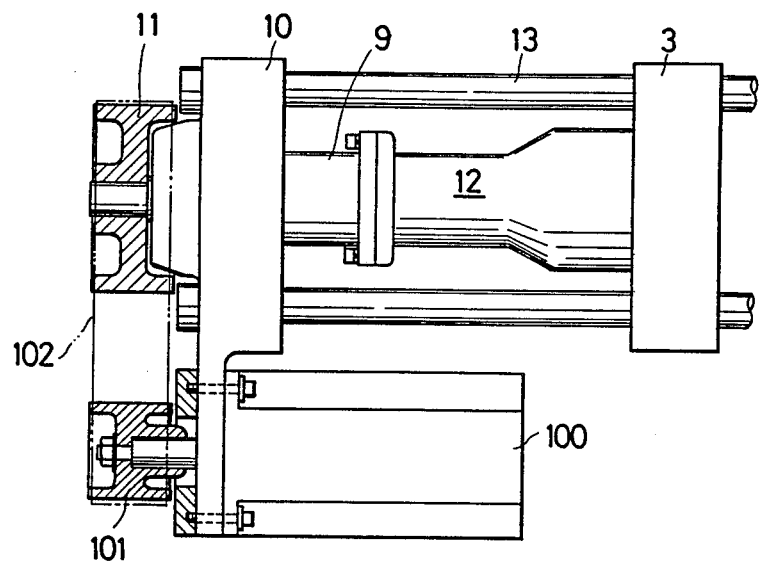
FIG. 3 is a schematic view showing a coupling mechanism for a mold clamping motor and a pulley shown in FIG. 1.

In FIGS. 1 and 2, like reference numerals refer to like elements. In FIG. 1, the mold clamping apparatus 2 is provided with an ejector 1 mounted on a movable platen 3 which is slidable along tie bars 13. A first ball screw 8 extends parallel to the tie bars 13, between the movable platen 3 and a rear platen 10. The rear end portion of the first ball screw 8, on the side remote from the movable platen 3, is supported on the rear platen 10 so as to be rotatably movable and axially immovable relative thereto, by means of a radial bearing 14, a thrust bearing 15, and an angular bearing 16, which are disposed in a large-diameter stepped center hole 10a penetrating the central portion of the rear platen 10. A pulley 11 is fixed to the rear end of the first ball screw 8, which is operatively coupled to a mold clamping motor 100, fixed to the rear platen 10, by means of the pulley 11, a pulley 101 fixed to the output shaft of the motor 100, and a belt 102 stretched between these two pulleys (see FIG. 3). A first ball nut 9 mates with the first ball screw 8 so that it can move axially along the ball screw 8 as the ball screw 8 rotates forwardly or reversely.

A push rod 12 for transmitting a driving force to the movable platen 3 is in the form of a hollow cylinder, and is disposed coaxial with the first ball screw 8. The rear and front ends of the rod 12 are coupled to the front end of the first ball nut 9 and the rear end face of a hollow cylindrical extension portion 3' of the movable platen 3, respectively. Thus, the first ball nut 9, the pusher rod 12, and the movable platen 3 are movable in one. The inside and outside diameters of the extension portion 3' are substantially equal to those of a spread portion of the rod 12.

A large-diameter stepped bore 12a penetrates the push rod 12 along the axis thereof. The first screw 8 loosely passes through the bore 12a. The axial length of the rod 12 or the bore 12a is set to a value equivalent to a required stroke of the movable platen 3 in order that the same platen can be moved through the required stroke. The movable platen extension portion 3' has a bore 3'a which communicates with the bore 12a.

The ejector 1 of the mold clamping apparatus 2 will now be described.

The ejector 1 includes a second ball nut 7 and a second ball screw 6 mating therewith. The ball nut 7 is disposed in the bore 12a of the push rod 12 and the bore 3'a of the movable platen extension portion 3' so as to be coaxial with the first ball screw 8, and is supported by the rod 12 and the movable platen extension portion 3' with the aid of a bearing 17 so as to be rotatably and axially immovable. A hole 7a, which receives the front end portion of the first ball screw 8, is axially formed in the rear half portion of second ball nut 7, in order to reduce the axial length of the mold clamping apparatus 2. Meanwhile, the second ball screw 6 is disposed in the bores 12a, 3'a and a holow portion 3a of the movable platen 3 coaxially with the first ball screw 8. The rear end portion of the second ball screw 6 is removably fitted in a hole 8a axially formed in the front end portion of the ball screw 8, whereby the axial length of the mold clamping apparatus is reduced. The depth of the hole 8a is set to a value great enough to prevent the first and second ball screws 8 and 6 from interfering with each other when the movable platen 3 is situated in its mold opening end position, and therefore, when an ejector pin 4 is in its rearmost position. The ejector pin 4 is fixed to the front end portion of the second ball screw 6. The pin 4 is allowed to project and retreat from the front end face of the movable platen 3 through a hole 3b, which is bored through the front wall of the movable platen 3 and communicates with the hollow portion 3a of the movable platen. A stopper plate 18 is fixed to the rear end of the ejector pin 4. The plate 18 is supported in the hollow portion 3a of the movable platen 3 by means of two fixing pins 19 so as to be nonrotatable but axially movable, for preventing the ball screw 6 and the ejector pin 4 from rotating, but allowing them to move axially when the ball nut 7 rotates.

Figure 4:
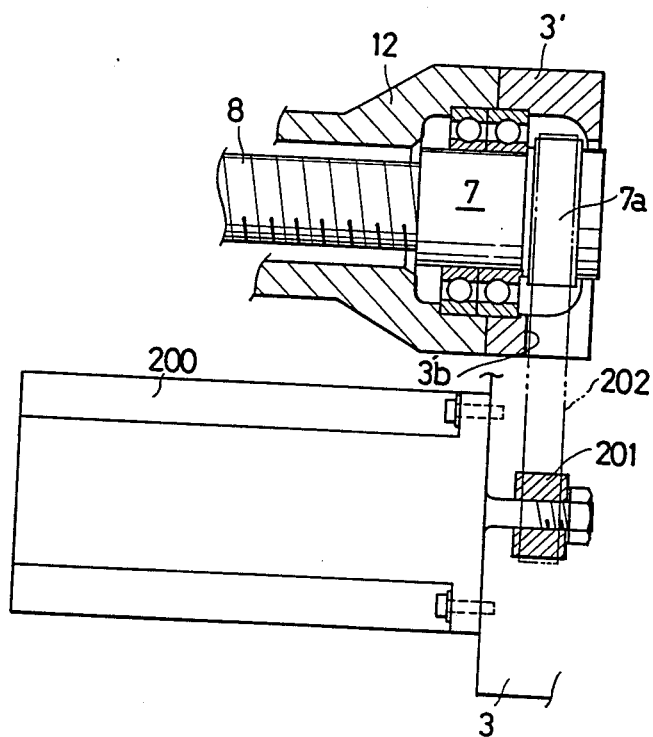
FIG. 4 is a partial schematic view showing a coupling mechanism for an ejector-use motor and an ejector-use ball nut shown in FIG. 1.

A timing gear 7b is formed on the outer peripheral surface of the intermediate portion of the second ball nut 7. As shown in FIG. 4, a timing belt 202 is stretched between the gear 7a and a timing gear 201, which is fixedly mounted on the output shaft of an ejector-use motor 200 fixed to the movable platen 3. Thus, the ball nut 7 is operatively coupled to the motor 200. A notch 3'b through which the belt 202 is taken out is formed in that part of the peripheral wall of the movable platen extension portion 3' on the side of the motor 200.

The mold clamping apparatus 2 is connected to a conventional control device (not shown) for controlling the drive of the mold clamping and ejector-use motors 100 and 200.

The following is a description of the operation of the mold clamping apparatus 2 constructed in this manner.

Let it now be supposed that the movable platen 3 is in the mold opening end position. In this mold opening position, the rear end portion of the second ball screw 6 is fitted in the hole 8a of the first ball screw 8, and is situated in its rearmost position, as shown in FIG. 1. This arrangement, in conjunction with the arrangement in which the front end portion of the first ball screw 8 is fitted in the hole 7a of the second ball nut 7, allows the mold clamping apparatus 2 to be compact.

When the mold clamping motor 100 rotates forward in response to a mold clamping command from the control device, the pulley 11 and the first ball screw 8 rotate forwardly, thereby causing the first ball nut 9 to advance. Thereupon, the movable platen 3, which is integral with the ball nut 9 and the push rod 12, advances, thereby performing mold closing operation and then mold clamping operation. During the mold clamping operation, a uniform mold clamping force is applied to the movable platen 3 through the push rod 12, which is coupled to the movable platen 3 through a circular ring-shaped junction plane. As the movable platen 3 moves in its mold closing direction, the ejector pin 4, along with the platen 3, advances, so that the rear end portion of the second ball screw 6, which is integral with the pin 4, gets out of the hole 8a of the first ball screw 8.

After injecting operation is executed in a mold clamping state, mold opening operation is performed. As the motor 100 reverses, the first ball screw 8 rotates reversely, so that the movable platen 3 retreats. Before the platen 3 reaches the mold opening end position again, the ejector-use motor 200 is rotated forward, thereby forwardly rotating the second ball nut 7 through the medium of the timing gears 7b and 201 and the timing belt 202. Thereupon, the second ball screw 6 and the ejector pin 4 advance, so that the pin 4 projects from the front end face of the movable platen 3, thereby pushing out a molding from a die (not shown) attached to the platen 3. Thereafter, the motor 200 is driven reversely to rotate the second ball nut 7 reversely, so that the ejector pin 4, which is integral with the second ball screw 6 mating with the nut 7, is retreated to the rearmost position shown in FIG. 1.

We claim:

1. A direct mold clamping apparatus comprising:
   a movable platen having a hollow portion and opposite end faces;
   a hollow push member having two opposite ends and being fixedly connected at one end to the movable platen;
   a first ball nut attached to said hollow push member at said one end thereof, and being non-rotatable relative to said push member and movable integrally with said push member;
   a first ball screw threadedly engaging the first ball nut and extending through said push member;
   a first drive source for rotating the first ball screw, thereby effecting mold closing or mold opening operation,
   said first ball screw having two opposite end portions and being axially formed with a hole in the end portion which faces the movable platen;
   said push member being coupled to a central portion of an end face of said movable platen facing said push member through a substantially annular junction plane; and
   an ejector which includes a second ball nut rotatably supported in said hollow portion of said movable platen and being rotatable and axially immovable relative to said movable platen, a second ball screw threadedly engaging said second ballnut, and being disposed in axial alignment with said first ball screw and having two opposite end portions, one of which is remote from said movable platen removably fitted in said hole of said first ball screw, an ejector pin fixedly connected to the other end portion of said second ball screw, and facing said movable platen and being projectable from the end face of said movable platen which is remote from said push member, and a second drive source operatively connected to said second ball nut.

2. A direct mold clamping apparatus according to claim 1, wherein said one end of said push member facing said movable platen is a hollow cylinder, and said junction plane between said push member and said movable platen is an annular ring.

3. A direct mold clamping apparatus according to claim 1, wherein said push member is a hollow cylinder, and is coaxial with said first and second ball nuts and said first and second ball screws.

4. A direct mold clamping apparatus according to claim 1, wherein the hole formed in said first ball screw has a length set to a value sufficient to prevent said first and second ball screw is situated in a rearmost position thereof.

5. A direct mold clamping apparatus according to claim 1, wherein said second ball nut has two opposite axial end portions, the end portion remote from said movable platen having a hole for receiving the end portion of said first ball screw facing said movable platen.

6. A direct mold clamping apparatus according to claim 1, wherein said first and second drive sources are first and second motors.

7. A direct mold clamping apparatus according to claim 2, wherein the hole formed in said first ball screw has a length set to a value sufficient to prevent said first and second ball screws from interfering with each other when said second ball screw is situated in a rearmost position thereof.

8. A direct mold clamping apparatus according to claim 3, wherein the hole formed in said first ball screw has a length set to a value sufficient to prevent said first and second ball screws from interfering with each other when said second ball screw is situated in a rearmost position thereof.

9. A direct mold clamping apparatus according to claim 2, wherein said second ball nut has two opposite axial end portions, the end portion remote from said movable platen having a hole for receiving the end portion of said first ball screw facing said movable platen.

10. A direct mold clamping apparatus according to claim 3, wherein said second ball nut has two opposite axial end portions, the end portion remote from said movable platen having a hole for receiving the end portion of said first ball screw facing said movable platen.

11. A direct mold clamping apparatus according to claim 2, wherein said first and second drive sources are first and second motors.

12. A direct mold clamping apparatus according to claim 3, wherein said first and second drive sources are first and second motors.

13. A direct mold clamping apparatus comprising:
a rear platen having tie bars connected thereto;
a movable platen slidably mounted on the tie bars;
an ejector movable into and out of the movable platen;
a first ball screw having two opposite end portions, one end portion being journalled in the rear platen and the other facing the movable platen;
a first ball nut threadedly engaging the first ball screw and being axially movable along the first ball screw in response to rotation of the first ball screw;
a push rod having a bore and two opposite ends, one end being coupled to the first ball nut and the other end being coupled to the movable platen;
a second ball screw coaxial with the first ball screw and having two opposite end portions, one end portion being movable into and out of the end portion of the first ball screw which faces the movable platen and the other end portion fixedly mounting the ejector;
a second ball nut threadedly engaging the second ball screw;
first means for rotating the first ball screw thereby imparting axial movement in the first ball nut, push rod, and movable platen in unison for effecting mold opening and closing operations; and
second means for rotating the second ball nut thereby imparting axial movement in the second ball screw for effecting a mold ejection operation.

* * * * *